United States Patent [19]

Kikuta et al.

[11] Patent Number: 4,972,918
[45] Date of Patent: Nov. 27, 1990

[54] ENGINE OUTPUT CONTROL DEVICE AND CONSTANT VEHICLE SPEED CONTROL RELEASE SWITCH

[75] Inventors: Junji Kikuta, Misato; Masayuki Kudo, Shiki; Tetsuo Yamagata, Tokyo; Yoshiyuki Nakajima, Iruma, all of Japan

[73] Assignee: Honda Giken Kogyo Kabushiki Kaisha, Tokyo, Japan

[21] Appl. No.: 365,581

[22] Filed: Jun. 13, 1989

Related U.S. Application Data

[63] Continuation-in-part of Ser. No. 129,214, Dec. 7, 1987, Pat. No. 4,848,502.

[30] Foreign Application Priority Data

Dec. 5, 1986 [JP] Japan .................................. 61-290259
Jun. 13, 1988 [JP] Japan .................................. 63-145199

[51] Int. Cl.⁵ .............................................. B60K 31/04
[52] U.S. Cl. .................................... 180/177; 123/352; 180/219

[58] Field of Search ............... 180/175, 176, 177, 178, 180/179, 219; 123/352, 360, 361

[56] References Cited

U.S. PATENT DOCUMENTS

| 4,580,537 | 4/1986 | Uchiyama | 180/177 |
| 4,610,230 | 9/1986 | Saito et al. | 123/360 |
| 4,611,561 | 9/1986 | Suyama | 180/175 |
| 4,848,502 | 7/1989 | Kikuta et al. | 180/219 |

FOREIGN PATENT DOCUMENTS 61-6032 1/1986 Japan .

Primary Examiner—David M. Mitchell
Attorney, Agent, or Firm—Pollock, Vande Sande and Priddy

[57] ABSTRACT

An engine output control and a constant vehicle speed control switch adapted to effect easy release of the control. The control comprises a throttle grip, a valve link with a return spring and a constant speed control, and a cable connecting these elements. The switch is connected to the cable and is responsive to the tension of an inner wire of the latter.

1 Claim, 8 Drawing Sheets

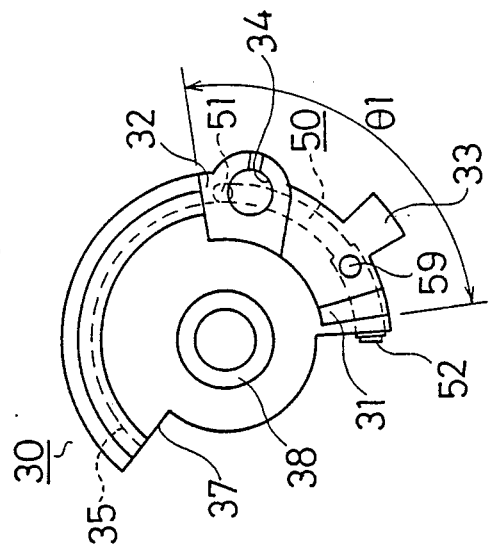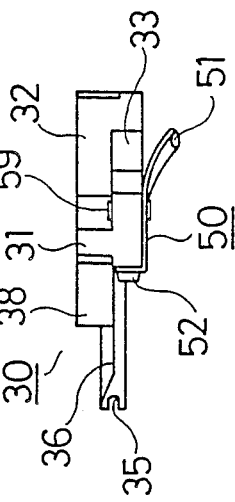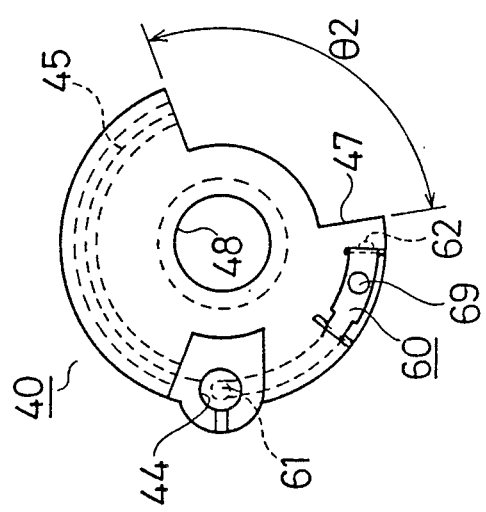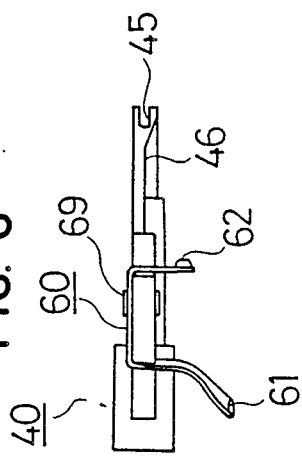

4,972,918

ENGINE OUTPUT CONTROL DEVICE AND CONSTANT VEHICLE SPEED CONTROL RELEASE SWITCH

CROSS-REFERENCE TO RELATED APPLICATION

This is a continuation-in-part of U.S. patent application Ser. No. 129,214, filed Dec. 7, 1987 (now U.S. Pat. No. 4,848,502, issued July 18, 1989).

FIELD OF THE INVENTION

The present invention relates to an engine output control device and a constant vehicle speed control release switch for a motorcycle or the like, and more particularly to an engine output control device and a constant vehicle speed control release switch capable of easily releasing constant vehicle speed control.

PRIOR ART

In an engine output control device for a motorcycle or the like, a constant vehicle speed control device for maintaining a vehicle speed of the motorcycle or the like constant is employed for the purpose of reducing fatigue of a driver during running and reducing a fuel consumption, for example.

While the constant vehicle speed control by the constant vehicle speed control device may be released by resetting a set switch of the constant vehicle speed control device, it is preferable that the releasing of the constant vehicle speed control can be effected only by operating a throttle grip, for example, without conducting any switch operation.

Such a constant vehicle speed control releasing device operable by the operation of the throttle grip is disclosed in Japanese Patent Laid-Open Publication No. 61-6032, for example.

In this conventional releasing device, when the throttle grip is rotated in a decelerating direction under constant vehicle speed control, there are generated stresses having counter directions in an inner wire and an outer wire both connected to a link for driving a throttle valve, and the stresses are detected to generate a release signal of the constant vehicle speed control.

That is, when the stresses having counter directions are applied to the inner wire and the outer wire, a movable stay connected to an end of the outer wire is moved in the direction of the stress, and accordingly, a contact of a microswitch is inverted to generate the release signal of the constant vehicle speed control.

As mentioned above, the conventional constant vehicle speed control releasing device is designed to generate a release signal of the constant vehicle speed control by the movement of the movable stay (namely, the movement of the outer wire). Therefore, the outer wire is required to be arranged such that it can be moved in a vehicle body of the motorcycle or the like.

Accordingly, design limitation of the vehicle body is increased to render the designing and manufacturing troublesome.

The present invention has been achieved to solve the above-mentioned problem, and it is an object of the present invention to provide an engine output control device and a constant vehicle speed control release switch which may generate a release signal of the constant vehicle speed control without detecting a change in position of an end of the outer wire.

SUMMARY OF THE INVENTION

The present invention has been realized from the idea such that when the throttle grip is rotated in a decelerating direction under the condition where constant vehicle speed control is conducted, a force applied to the inner wire connected to the throttle grip is counter in direction to that in a slide control direction of the inner wire by the constant vehicle speed control device, resulting in an increase in tension of the inner wire.

According to one aspect of the present invention, there is provided an engine output control device comprising a throttle grip, a valve link having a return spring, a constant vehicle speed control device, a cable member for connecting the throttle grip, the valve link and the constant vehicle speed control device together, and a release switch connected to the cable member for releasing energization of the constant vehicle speed control device according to a change in tension of an inner wire of the cable member.

With this arrangement, the constant vehicle speed control can be released only by detecting a change in tension of the inner wire.

According to another aspect of the present invention, the release switch comprises first and second pulleys rotatably mounted on a common shaft; first and second conductors fixed to said first and second pulleys in such a manner that one end of said first conductor is opposed to one end of said second conductor; spring means for biasing said first and second pulleys in counter directions in such a manner that said one end of said first conductor is brought into contact with or separation from said one end of said second conductor; a pair of conductive terminal plates disposed in such a manner that the other ends of said first and second conductors are slidable thereon, respectively; and inner wire mounting means formed in said first and second pulleys for mounting said inner wires to said first and second pulleys in such a manner as to draw said first and second pulleys in directions counter to biasing directions of said spring means.

With this arrangement, only when a force exceeding the biasing force of the spring means is applied to the inner wire, the release switch is turned off, and a change in tension of the inner wire can be reliably detected.

BRIEF DESCRIPTION OF THE DRAWINGS

FIG. 3 is a plan view of the first pulley;

FIG. 4 is an elevational view of FIG. 3;

FIG. 5 is a plan view of the second pulley;

FIG. 6 is an elevational view of FIG. 5;

DESCRIPTION OF PREFERRED EMBODIMENTS

There will now be described some preferred embodiments of the present invention with reference to the drawings.

Figure 1:
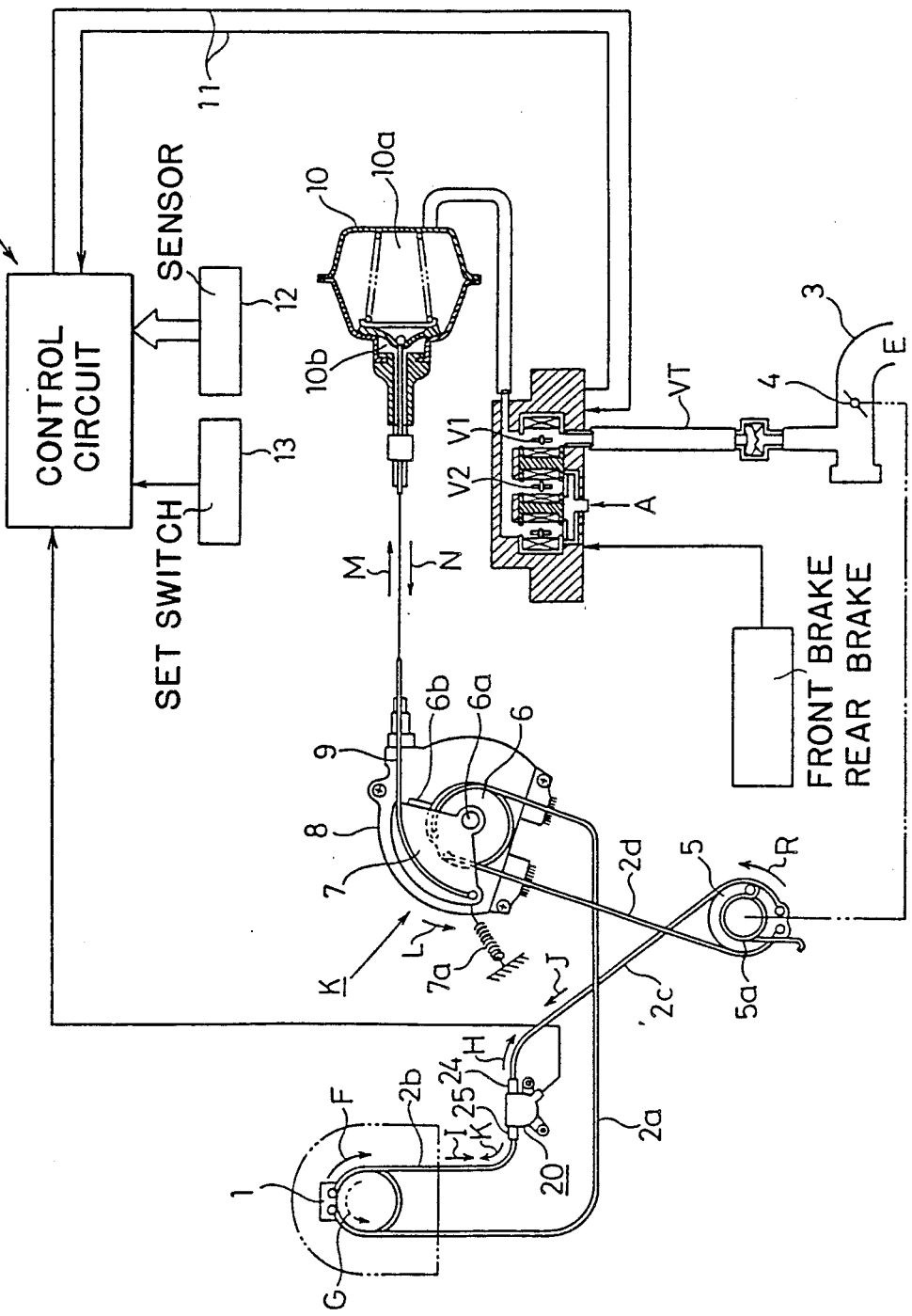
FIG. 1 is a diagrammatic illustration of the first preferred embodiment of the engine output control device according to the present invention.

FIG. 1 is a diagrammatic illustration of a preferred embodiment of the engine output control device according to the present invention.

Referring to FIG. 1, reference numeral 1 designates a throttle grip mounted to a steering handle of a motorcycle or the like. Cable members 2a and 2b are connected at their respective one ends to the throttle grip 1, and are also connected at the other ends to a throttle grip link 6 and a release (reset) switch 20, respectively,. The throttle grip link 6 is rotatably mounted on a rotating shaft 6a in a throttle valve opening regulating mechanism K. The construction of the release switch 20 will be hereinafter described with reference to FIGS. 2 to 13.

Reference numeral 5 designates a valve link for opening and closing a throttle valve 4. The valve link 5 is normally biased in a valve closing direction (in a direction of arrow R) by a return spring 5a. Cable members 2c and 2d are connected at their respective one ends to the valve link 5, and are also connected at the other ends to the release switch 20 and the throttle grip link 6, respectively.

Each of the cable members 2a-2d is comprised of a flexible outer wire and an inner wire inserted in the outer wire.

As mentioned above, the valve link 5 is normally biased in the valve closing direction by the return spring 5a. When the throttle grip 1 is rotated in an accelerating direction (in a direction of arrow F), the throttle grip link 6 is rotated in a direction counter to a direction of arrow L by the inner wire of the cable member 2a, and the valve link 5 is then rotated in a valve opening direction of the throttle valve 4 (in a direction counter to the direction of arrow R) by the inner wire of the cable member 2d against a resilient force of the return spring 5a. As a result, the inner wires of the cable members 2c and 2b are moved in a direction of arrow H and in a direction of arrow I, respectively.

Conversely, when the throttle grip 1 is rotated in a decelerating direction (in a direction of arrow G), the valve link 5 is rotated in the direction of arrow R by the resilient force of the return spring 5a to thereby close the throttle valve 4. At the same time, the inner wires of the cable members 2a-2d and the throttle grip 1 are returned to the original position.

The throttle valve opening regulating mechanism K is also provided with a throttle link 7 rotatably mounted on the rotating shaft 6a in the same manner as with the throttle grip link 6. The throttle link 7 is normally biased in the direction of arrow L by a return spring 7a.

Although the return spring 7a is a tensile coil spring in the preferred embodiment, it may be a torsional coil spring connected at its one end to the throttle link 7 and connected at the other end to a casing 8.

A cable member 9 is connected at its one end to the throttle link 7, and is also connected at the other end to a diaphragm 10b of an actuator 10.

The diaphragm 10b is operated by an engine vacuum to be induced into a vacuum chamber 10a. The induction of the engine vacuum is effected from a suction pipe 3 of an engine E through a vacuum tank VT and an accelerating vacuum valve V1.

Reference numeral V2 designates a vent valve for inducing an atmospheric air A at deceleration.

These valves V1 and V2 are controlled by a control signal 11 to be generated from a control circuit C.

When the engine vacuum is induced into the actuator 10, the cable member 9 connected to the diaphragm 10b is drawn in a direction of arrow M to rotate the throttle link 7 in the direction counter to the direction of arrow L against the resilient force of the return spring 7a. At this time, when the throttle link 7 comes into abutment against a stopper 6b formed in the throttle grip link 6, the throttle grip link 6 is also rotated in the same direction. As a result, the valve link 5 is rotated in the valve opening direction of the throttle valve 4 (in the direction counter to the direction of arrow R), thereby increasing a vehicle speed.

Conversely, when the vacuum in the actuator 10 is reduced, the throttle link 7 is rotated in the direction of arrow L by the resilient force of the return spring 7a to thereby return the cable member 9 in a direction of arrow N. The throttle grip link 6 is also rotated in the direction of arrow L by the resilient force of the return spring 5a. As a result, the valve link 5 is rotated in the closing direction of the throttle valve 4 (in the direction of arrow R), thereby reducing the vehicle speed.

The control circuit C is comprised of a microcomputer or the like, and it generates control signals in response to various engine parameters such as a vehicle speed signal and a brake switch signal to be generated from various sensors 12.

When a set swithc 13 generating a command signal for controlling the vehicle speed to be constant is turned on during running, the control circuit C controls to open and close the accelerating vacuum valve V1 and the decelerating vent valve V2 and thereby controls the vacuum in the actuator 10, so as to make the actual vehicle speed during running accord with the vehicle speed set by the set switch 13.

Under such a constant vehicle speed controlled condition as mentioned above, when the throttle grip 1 is rotated in the accelerating direction (in the direction of arrow F), the stopper 6b is moved away from the throttle link 7, and the throttle grip link 6 only is rotated in the accelerating direction (in the direction counter to the direction of arrow L). As a result, the vehicle speed is increased.

Conversely, when the throttle grip 1 is rotated in the decelerating direction (in the direction of arrow G) under the constant vehicle speed controlled condition, the release switch 20 is operated to output a release signal (reset signal) for releasing the constant vehicle speed control to the control circuit C.

There will now be described the construction and the operation of the release switch 20.

Figure 2:
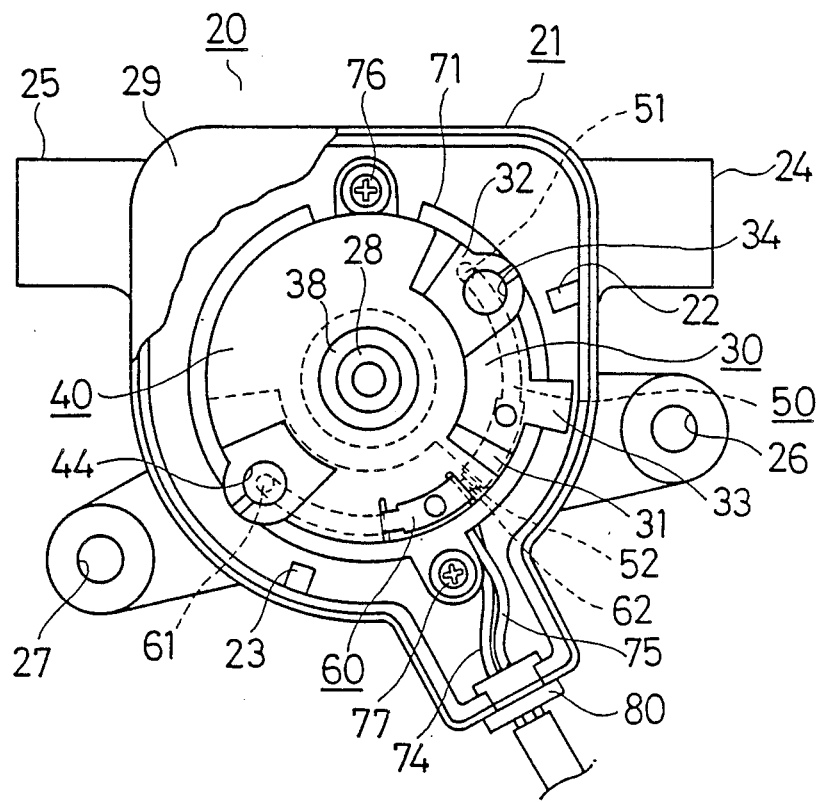
FIG. 2 is a plan view of the preferred embodiment of the constant vehicle speed control release switch according to the present invention.

FIG. 2 is a plan view of a preferred embodiment of the release switch 20, in which a cover 29 is partially broken away, and the inner wire to be connected to the release switch 20 is omitted for the purpose of ready understanding of the construction.

Referring to FIG. 2, the release switch 20 is basically constructed of a casing 21, a first pulley 30, a first conductor 50 fixed to the first pulley 30, a second pulley 40, a second conductor 60 fixed to the second pulley 40, a coil spring 90 (which will be hereinafter described with reference to FIG. 7) disposed between the first pulley 30 and the second pulley 40, an insulating plate 71 and a pair of conductive terminal plates 72 and 73 (which will be hereinafter described with reference to FIG. 9) fixed to the insulating plate 71.

FIG. 3 is a plan view of the first pulley 30, and FIG. 4 is an elevational view of FIG. 3. In both the figures, the same reference numerals as in FIG. 2 designate the same or corresponding parts.

The first pulley 30 is a disc-like member having a cutout portion 37 serving as a relief portion for a plate contact 61 and a movable contact 62 of the second conductor 60 to be fixed to the second pulley 40 which will be hereinafter described with reference to FIGS. 5 and 6.

The first pulley 30 is formed at its central position with a cylindrical projection 38, and is further formed at its outer peripheral portion with a cylindrical hole (inner wire mounting means) 34 for receiving a cylindrical member (not shown) fixed to an end of the inner wire and with a wire channel 35 for guiding the inner wire.

The first pulley 30 is further formed at its outer periphery with a stopper 33 projecting from the outer periphery.

Reference numeral 36 designates a recess for receiving the coil spring 90 which will be hereinafter described with reference to FIG. 7.

The first pulley 30 is further formed on its upper surface with stepped portions 31 and 32.

The first conductor 50 is fixed to the first pulley 30 by a rivet 59 in such a manner that one end (plate contact) 51 of the first conductor 50 is disposed under the first pulley 30 and the other end (movable contact) 52 is disposed on the side surface of the first pulley 30.

FIG. 5 is a plan view of the second pulley 40, and FIG. 6 is an elevational view of FIG. 5. In both the figures, the same reference numerals as in FIG. 2 designate the same or corresponding parts.

The second pulley 40 is a disc-like member having a cutout portion 47 serving as a relief portion for the stepped portions 31 and 32 of the first pulley 30 as previously mentioned with reference to FIGS. 3 and 4. The cutout portion 47 has an opening angle $\theta 2$ measured with respect to the center of the second pulley 40. The opening angle $\theta 2$ is set to be greater than an opening angle $\theta 1$ between the outer ends of both the stepped portions 31 and 32 as measured with respect to the center of the first pulley 30.

The second pulley 40 is formed at its central position with a circular hole 48, and is further formed at its outer peripheral portion with a cylindrical hole (inner wire mounting means) 44 for receiving a cylindrical member (not shown) fixed to an end of the inner wire and with a wire channel 45 for guiding the inner wire.

Reference numeral 46 designates a recess for receiving the coil spring 90 which will be hereinafter described with reference to FIG. 7 in cooperation with the recess 36 of the first pulley 30.

The second conductor 60 is fixed to the second pulley 40 by a rivet 69 in such a manner that one end (plate contact) 61 of the second conductor 60 is disposed under the second pulley 40 and the other end (movable contact) 62 is disposed on the side surface of the second pulley 40.

Figure 7:
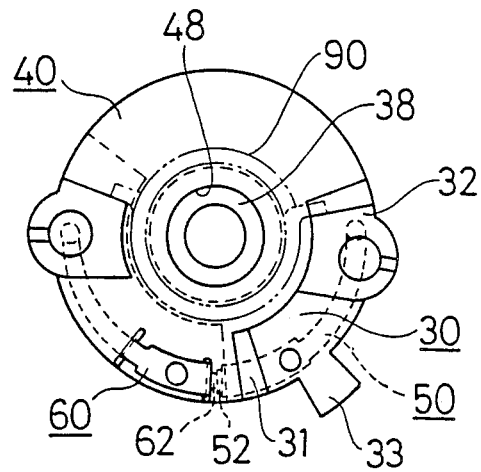
FIG. 7 is a plan view of the assembly of the first pulley and the second pulley.

Referring to FIG. 7, the cylindrical projection 38 of the first pulley 30 is inserted into the circular hole 48 of the second pulley 40 in such a manner that both the stepped portions 31 and 32 of the first pulley 30 are disposed in the cutout portion 47 of the second pulley 40.

Figure 8:
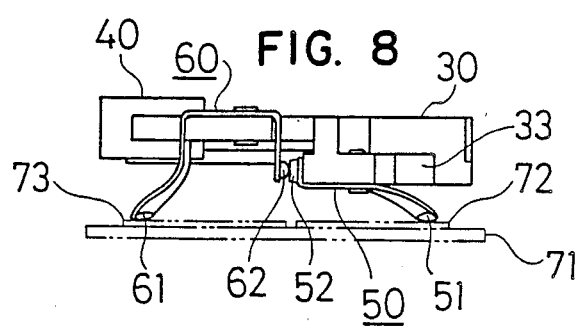
FIG. 8 is an elevational view of FIG. 7.
Figure 13:
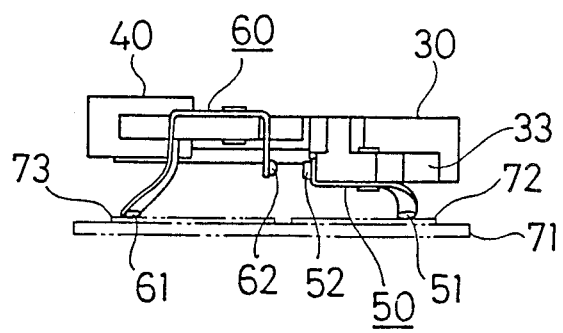
FIG. 13 is a view of the first and second pulleys taken from the arrow Z in FIG. 12.

Upon insertion of the cylindrical projection 38 into the circular hole 48, the coil spring 90 is disposed between the first pulley 30 and the second pulley 40 (between the recess 36 and the recess 46) as shown by an alternate long and two short dashes line. As shown in FIG. 8, the coil spring 90 biases the first pulley 30 and the second pulley 40 in the counter directions in such a manner that the movable contact 52 of the first conductor 50 fixed to the first pulley 30 contacts the movable contact 62 of the second conductor 60 fixed to the second pulley 40.

Figure 9:
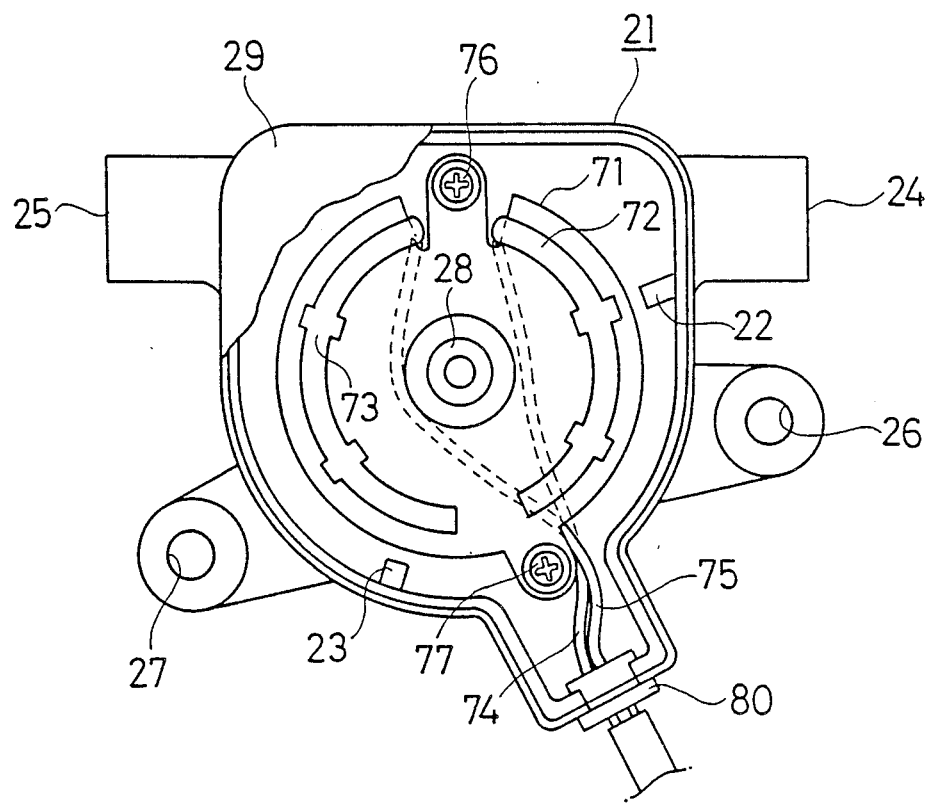
FIG. 9 is a plan view of the casing and the insulating plate mounted to the casing.

FIG. 9 is a plan view of the casing 21 and the insulating plate 71 mounted to the casing 21, wherein the same reference numerals as in FIG. 2 designate the same or corresponding parts.

Referring to FIG. 9, the insulating plate 71 is fixed to a bottom surface of the casing 21 by means of mounting screws 76 and 77.

As shown in FIG. 9, a pair of conductive terminal plates 72 and 73 are fixed to the insulating plate 71 in such a manner that they are disposed about a fixed shaft 28 standing from the casing 21 at the same radial distance and they are insulated from each other. A pair of lead wires 74 and 75 are connected at their one ends to the terminal plates 72 and 73, respectively, and they are drawn out of the casing 21 through a grommet 80. The other ends of the lead wires 74 and 75 are connected to the control circuit C as shown in FIG. 1.

The casing 21 is formed at its inner wall with inward projections 22 and 23. Reference numerals 24 and 25 designate wire insertion holes, and reference numerals 26 and 27 designate mounting holes for mounting the release switch 20.

The assembly of the first pulley 30 and the second pulley 40 with the coil spring 90 interposed therebetween as shown in FIG. 7 is mounted to the casing 21 having the insulating plate 71 as shown in FIG. 9. That is, the cylindrical projection 38 of the first pulley 30 is engaged with the fixed shaft 28 of the casing 21, and a C-shaped washer or a screw, for example, is mounted to an end portion of the fixed shaft 28 so as not to disengage the first pulley 30 and the second pulley 40 from the fixed shaft 28. FIG. 2 shows such a mounted condition of the first pulley 30 and the second pulley 40 into the casing 21, wherein the C-shaped washer or the like is not shown for the purpose of ready understanding of the construction.

Under the mounted condition, the plate contact 51 of the first pulley 30 contacts the terminal plate 72 fixed to the insulating plate 71, and the plate contact 61 of the second pulley 40 contacts the terminal plate 73 fixed to the insulating plate 71 as shown by an alternate long and two short dashes line FIG. 8. Accordingly, the lead wires 74 and 75 to be drawn out of the release switch 20 are short-circuited under this condition.

Referring back to FIGS. 1 and 2, the cylindrical member (not shown) fixed to one end of the inner wire of the cable member 2b is inserted from the wire insertion hole 25 into the release switch 20, and is engaged with the cylindrical hole 34 while the inner wire being guided by the wire channel 35 (See FIG. 3) of the first pulley 30.

Similarly, the cylindrical member (not shown) fixed to one end of the inner wire of the cable member 2c is inserted from the wire insertion hole 24 into the release switch 20, and is engaged with the cylindrical hole 44 while the inner wire being guided by the wire channel 45 (See FIG. 5) of the second pulley 40.

In the case that the constant vehicle speed control is not conducted, that is, the throttle link 7 is in the normal position where it is biased by the return spring 7a in the direction of arrow L (See FIG. 1), the throttle grip link 6 is permitted to be rotated in response to the rotation of the throttle grip 1 in both the directions of arrows F and G without being limited by the throttle link 7 (that is, without abutment of the stopper 6b against the throttle link 7). Accordingly, the valve link 5 is permitted to be rotated in response to the rotation of the throttle grip 1.

At this time, the inner wires of the cable members 2b and 2c receive forces having the same direction. Therefore, the first pulley 30 and the second pulley 40 in the release switch 20 are rotated in the same direction with the movable contact 52 and the movable contact 62 maintained in contact with each other.

In other words, when the throttle grip 1 is rotated in the accelerating direction (in the direction of arrow F), the valve link 5 is rotated in the direction counter to the direction of arrow R to thereby draw the inner wire of the cable member 2c in the direction of arrow H. On the other hand, the inner wire of the cable member 2b is urged in the direction of arrow I by the rotation of the throttle grip 1. As a result, there is not generated a force sufficient to separate the movable contact 52 of the first pulley 30 from the movable contact 62 of the second pulley 40 (See FIG. 10).

Conversely, when the throttle grip 1 is rotated in the decelerating direction (in the direction of arrow G), the inner wire of the cable member 2b is drawn in the direction of arrow K by the rotation of the throttle grip 1. On the other hand, the valve link 5 is rotated in the direction of arrow R by the resilient force of the return spring 5a to thereby urge the inner wire of the cable member 2c in the direction of arrow J. As a result, there is not generated a force sufficient to separate the movable contact 52 from the movable contact 62 (See FIG. 11).

Figure 10:
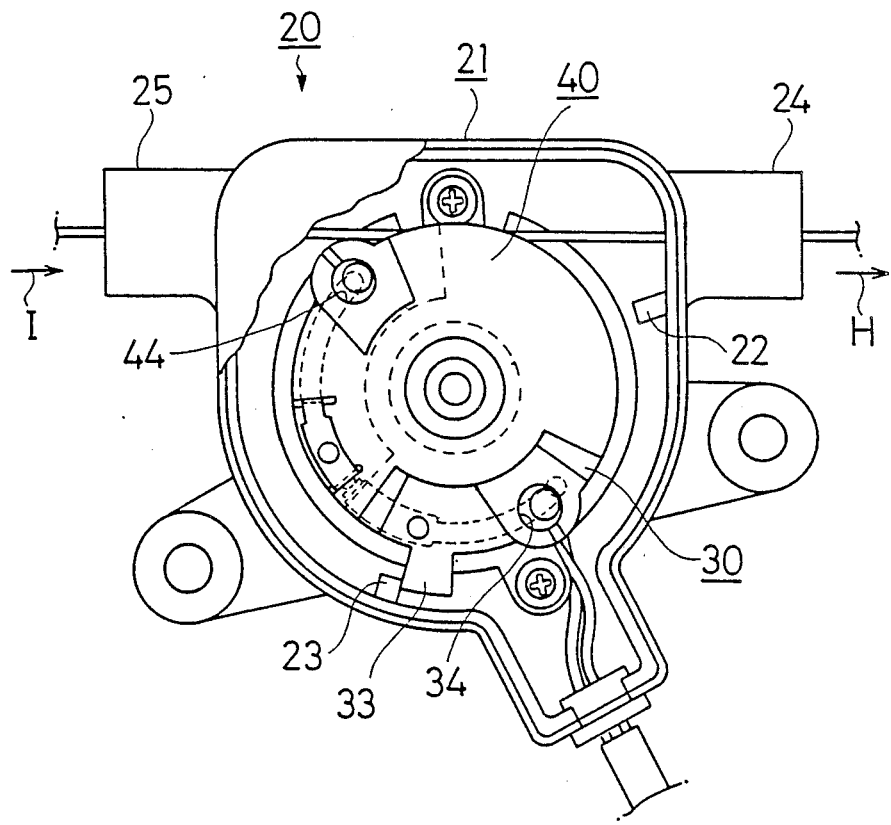
FIGS. 10 and 11 are plan views of the release switch, illustrating the rotational operation of the first and second pulleys when the throttle grip is rotated under the condition where the constant vehicle speed control is not conducted.
Figure 11:
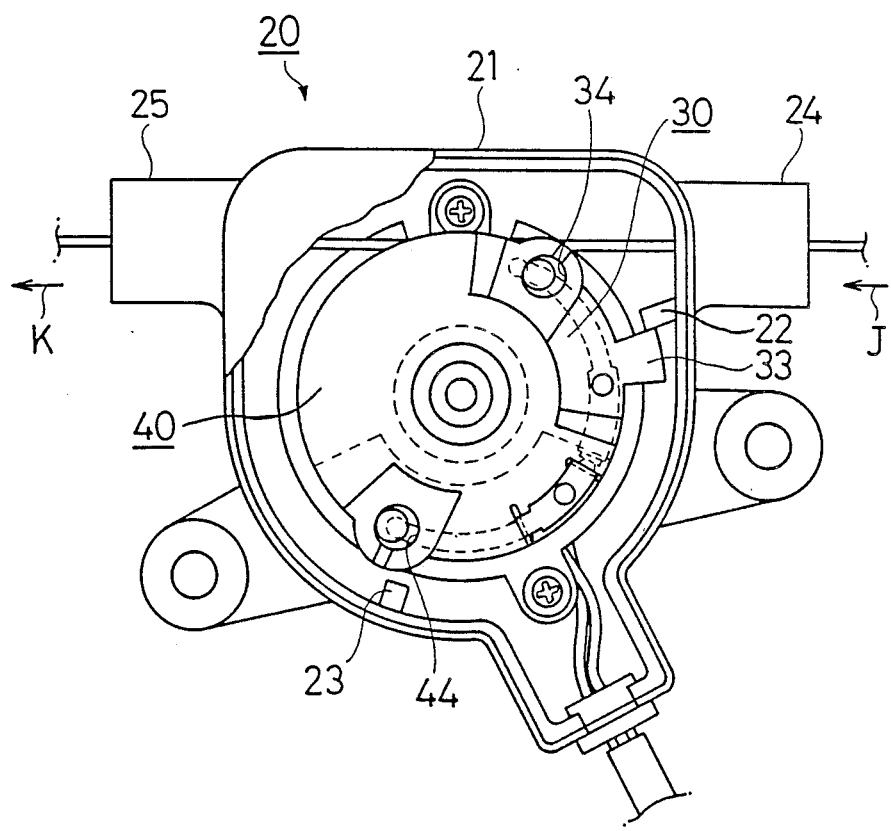
Figure 12:
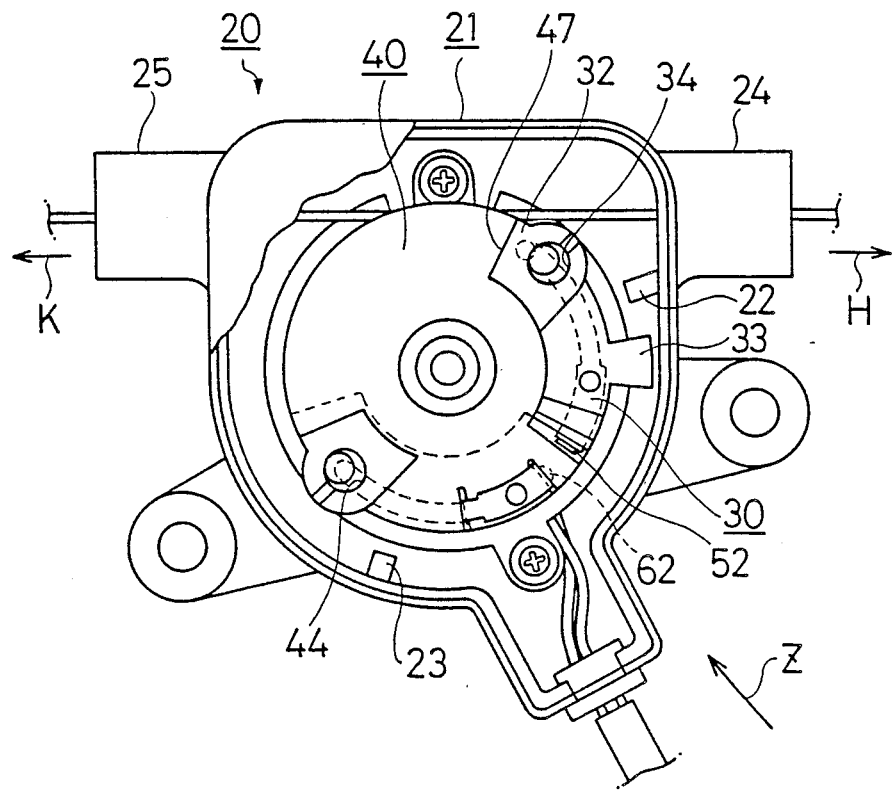
FIG. 12 is a plan view of the release switch, illustrating the rotational operation of the first and second pulleys when the throttle grip is rotated in the decelerating direction under the condition where the constant vehicle speed control is conducted.

As shown in FIG. 10, the stopper 33 of the first pulley 30 abuts against the projection 23 of the casing 21 to thereby limit the clockwise rotation of the first pulley 30 and the second pulley 40. Similarly, as shown in FIG. 11, the stopper 33 abuts against the projection 22 of the casing 21 to thereby limit the counterclockwise rotation of the first pulley 30 and the second pulley 40.

During the rotation of the first pulley 30 and the second pulley 40, the plate contacts 51 and 61 slide on the arcuate terminal plates 72 and 73, respectively, thereby maintaining the release switch 20 under the on-state.

In the case that the constant vehicle speed control is conducted, the throttle link 7 is rotated in the direction counter to the direction of arrow L by the operation of the actuator 10 (See FIG. 1) to urge the stopper 6b of the throttle grip link 6 and thereby rotate the throttle grip link 6 and the valve link 5 as mentioned previously. Under the condition, when the throttle grip 1 is rotated in the accelerating direction (in the direction of arrow F), the stopper 6b is moved away from the throttle link 7 to rotate the valve link 5 in the accelerating direction, thereby accelerating the engine.

When the torque applied to the throttle grip 1 in the accelerating direction is removed, the valve link 5 is rotated in the decelerating direction by the resilient force of the return spring 5a. Accordingly, the stopper 6b is brought into abutment against the throttle link 7 again, thus obtaining the constant vehicle speed controlled condition again.

Conversely, when the throttle grip 1 is rotated in the decelerating direction (in the direction of arrow G) under the constant vehicle speed control, the torque of the throttle grip 1 is transmitted to the throttle grip link 6, and the stopper 6b abutting against the throttle link 7 is further urged against the throttle link 7. In other words, the inner wire of the cable member 2b is tension loaded in the direction of arrow K, and the inner wire of the cable member 2c is tension loaded in the direction of arrow H.

Accordingly, the first pulley 30 and the second pulley 40 of the release switch 20 receive the large forces greater than the resilient force of the coil spring 90, and change their relative positions to make the movable contact 52 and the movable contact 62 separate from each other.

As a result, the release switch 20 is turned off to release the constant vehicle speed control.

Just after the movable contact 52 is separated from the movable contact 62, the stepped portion 32 of the first pulley 30 abuts against the cutout portion 47 of the second pulley 40, causing the rotation of the second pulley 40 together with the first pulley 30. As a result, the throttle link 7 is forcibly rotated in the direction of arrow L by the stopper 6b substantially at the same time the constant vehicle speed control is released, thereby rotating the valve link 5 in the decelerating direction (in the direction of arrow R).

When the constant vehicle speed control is released, the actuator 10 becomes inoperative, and the throttle link 7 receives the resilient force of the return spring 7a. Accordingly, the tension of the inner wire of the cable member 2c in the direction of arrow H is reduced or removed. As a result, the movable contact 52 and the movable contact 62 are brought into contact with each other again by the resilient force of the coil spring 90 disposed between the first pulley 30 and the second pulley 40. Thus, the constant vehicle speed control is now ready for execution again.

In this manner, only when a force exceeding the resilient force of the coil spring 90 is applied to the inner wire, the contacts of the release switch are broken. Therefore, a change in tension of the inner wire can be reliably and instantaneously detected.

In the above preferred embodiment, the release switch 20 is located in the wire link (between the cable members 2b and 2c) adapted to be moved toward the throttle grip 1 at deceleration. However, the present invention is not limited to this arrangement. For example, the release switch 20 may be located in the wire link (the cable member 2d) between the valve link 5 and the throttle valve opening regulating mechanism K.

In such a modified arrangement as mentioned above, it is necessary to set the resilient force of the coil spring 90 for biasing the first pulley 30 and the second pulley 40 to be greater than a tractive force of the cable member 2d to be drawn by the rotation of the valve link 5 by the return spring 5a. That is, it is necessary to avoid that the movable contact 52 and the movable contact 62 are brought into separation from each other by the tractive force only.

As mentioned previously, the stepped portion 32 of the first pulley 30 abuts against the cutout portion 47 of the second pulley 40 just after the separation of the movable contact 52 from the movable contact 62, thereby forcibly rotating the throttle link 7 in the direction of arrow L by the stopper 6b. Accordingly, even if a response delay occurs upon releasing of the constant vehicle speed control device, the valve link 5 is instantaneously rotated in the decelerating direction (in the direction of arrow R).

However, in the case that there is no possibility of such a response delay occurring upon releasing of the constant vehicle speed control device, it is of course unnecessary to especially form the stepped portion 32.

Further, in the above preferred embodiment, the plate contact 51 of the first conductor 50 and the plate contact 61 of the second conductor 60 are directed to the bottom surface of the casing 21, and the terminal plates 72 and 73 are so arranged as to contact the plate contacts 51 and 61, respectively. However, the present invention is not limited to this arrangement. For example, the plate contacts 51 and 61 may be directed to the outer circumferences of the first pulley 30 and the second pulley 40, respectively, and the terminal plates 72 and 73 may be mounted in the casing 21 so as to be opposed to the plate contacts 51 and 61, respectively.

Further, in the above preferred embodiment, the movable contacts 52 and 62 are normally in contact with each other by the resilient force of the coil spring 90, and only when a force exceeding the resilient force of the coil spring 90 is applied to the inner wire, the movable contacts 52 and 62 are brought into separation from each other. However, the present invention is not limited to this construction. For example, the movable contacts 52 and 62 may be normally in separation from each other by the resilient force of the coil spring 90, and only when a force exceeding the resilient force of the coil spring 90 is applied to the inner wire, the movable contacts 52 and 62 may be brought into contact with each other. As such a modified construction will be easily realized by those skilled in the art, the explanation thereof will be omitted herein.

Figure 14:
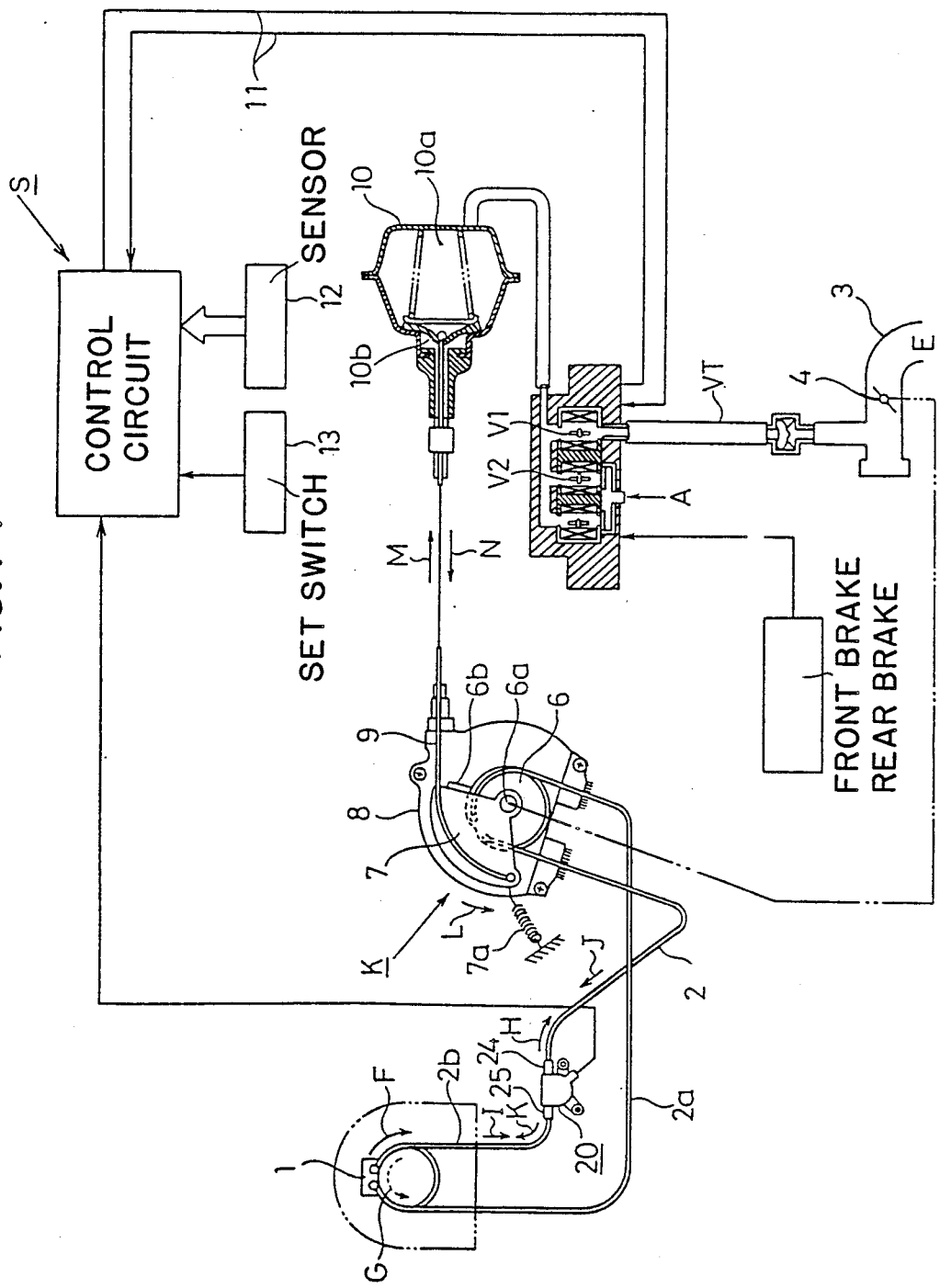
FIG. 14 is a diagrammatic illustration of the second preferred embodiment of the engine output control device according to the present invention.

FIG. 14 shows a modified embodiment of FIG. 1, wherein the throttle grip link 6 is directly connected through cable members to the throttle valve 4, and the cable members 2c and 2d shown in FIG. 1 are replaced by a single cable member 2e. In this embodiment, it is apparent that the same operation as in the previous preferred embodiment is carried out with a simpler construction.

(Effect of the Invention)

As apparent from the above description, the present invention may achieve the following effects.

(1) As the constant vehicle speed control can be released only by detecting a change in tension of the inner wire, it is unnecessary to arrange the outer wire to be movable in the vehicle body of the motorcycle or the like.

Accordingly, design limitation of the vehicle body may be reduced to enable easy designing.

(2) As the contacts of the release switch is broken only when a force exceeding the resilient force of the coil spring biasing the first and second pulleys is applied to the inner wire, a change in tension of the inner wire may be reliably detected.

What is claimed is:

1. A constant vehicle speed control release switch connected to a cable member provided among a throttle grip, constant vehicle speed control means and a valve link provided with a return spring and connected to throttle valve, for releasing energization of said constant vehicle speed control means according to a change in tension of an inner wire of said cable member, said constant vehicle speed control release switch comprising
   (a) first and second pulleys rotatably mounted on a common shaft;
   (b) first and second conductors each having movable contacts fixed to said first and second pulleys in such a manner that one end of said first conductor is opposed to one end of said second conductor;
   (c) spring means for biasing said first and second pulleys in opposite directions in such a manner that said movable contact of said first conductor is selectively brought into and out of contact with said movable contact of said second conductor;
   (d) a pair of conductive terminal plates disposed in such a manner that the other ends of said first and second conductors are slidable thereon, respectively; and
   (e) inner wire mounting means formed in each of said first and second pulleys for mounting said inner wires to said first and second pulleys in such a manner as to draw said first and second pulleys in directions counter to biasing directions of said spring means upon rotation of said throttle grip in accelerating and decelerating directions.

* * * * *